(12) United States Patent
Kosar et al.

(10) Patent No.: US 10,322,381 B2
(45) Date of Patent: Jun. 18, 2019

(54) HIGH TOUGHNESS HOLLOW FIBER MEMBRANES BASED ON VINYLIDENE FLUORIDE POLYMERS

(71) Applicant: Arkema Inc., King of Prussia, PA (US)

(72) Inventors: Walter P. Kosar, Pottstown, PA (US); Roderick Reber, III, Maple Glen, PA (US); Gregory S. O'Brien, Downingtown, PA (US); Scott R. Gaboury, Blue Bell, PA (US); Roice A. Wille, Malvern, PA (US)

(73) Assignee: ARKEMA INC., King of Prussia, PA (US)

( * ) Notice: Subject to any disclaimer, the term of this patent is extended or adjusted under 35 U.S.C. 154(b) by 137 days.

(21) Appl. No.: 15/328,115

(22) PCT Filed: Jul. 21, 2015

(86) PCT No.: PCT/US2015/041219
§ 371 (c)(1),
(2) Date: Jan. 23, 2017

(87) PCT Pub. No.: WO2016/014446
PCT Pub. Date: Jan. 28, 2016

(65) Prior Publication Data
US 2017/0216780 A1    Aug. 3, 2017

Related U.S. Application Data

(60) Provisional application No. 62/027,367, filed on Jul. 22, 2014.

(51) Int. Cl.
*B01D 71/34* (2006.01)
*B01D 71/38* (2006.01)
(Continued)

(52) U.S. Cl.
CPC ............. *B01D 71/34* (2013.01); *B01D 69/02* (2013.01); *B01D 69/08* (2013.01); *B01D 71/36* (2013.01);
(Continued)

(58) Field of Classification Search
CPC ............ B01D 2323/12; B01D 2323/18; B01D 2325/24; B01D 69/02; B01D 69/08;
(Continued)

(56) References Cited

U.S. PATENT DOCUMENTS

| 4,377,481 A | 3/1983 | Jakabhazy |
| 4,399,035 A | 8/1983 | Nohmi et al. |

(Continued)

FOREIGN PATENT DOCUMENTS

CN    101199919    12/2006

OTHER PUBLICATIONS

Shulin An, Practical Tutorials on Membrane Science and Technology; Chemical Industry Press; pp. 43-46; Feb. 2005.

*Primary Examiner* — John Kim
(74) *Attorney, Agent, or Firm* — Thomas Roland; Joanne Rossi

(57) ABSTRACT

Hollow fiber membranes having improved toughness and durability are prepared using a vinylidene fluoride polymer-containing component, such as Kynaro resins, having relatively low crystallinity. One aspect of the invention provides a membrane in the form of a fiber, wherein i) the fiber has a porous wall of a polymeric component enclosing a central hollow space extending the length of the fiber, ii) the polymeric component has a crystallinity as determined by wide angle x-ray diffraction of less than about 35%, iii) the polymeric component is comprised of at least one homopolymer or copolymer of vinylidene fluoride and iv) the
(Continued)

membrane has an energy to break of at least about 0.5 J per square mm of membrane cross section.

21 Claims, 1 Drawing Sheet

(51) Int. Cl.
| | |
|---|---|
| B01D 71/36 | (2006.01) |
| B29C 48/05 | (2019.01) |
| D01F 1/08 | (2006.01) |
| D01F 6/12 | (2006.01) |
| B29C 48/02 | (2019.01) |
| B29C 48/10 | (2019.01) |
| B29C 48/00 | (2019.01) |
| B01D 69/02 | (2006.01) |
| B01D 69/08 | (2006.01) |
| B01D 71/76 | (2006.01) |
| D01D 5/247 | (2006.01) |
| B01D 71/32 | (2006.01) |
| B29K 27/00 | (2006.01) |
| B29L 23/00 | (2006.01) |
| B29L 31/00 | (2006.01) |

(52) U.S. Cl.
CPC .............. *B01D 71/38* (2013.01); *B01D 71/76* (2013.01); *B29C 48/022* (2019.02); *B29C 48/05* (2019.02); *B29C 48/10* (2019.02); *D01D 5/247* (2013.01); *D01F 1/08* (2013.01); *D01F 6/12* (2013.01); *B01D 71/32* (2013.01); *B01D 2323/12* (2013.01); *B01D 2323/18* (2013.01); *B01D 2325/24* (2013.01); *B29K 2027/16* (2013.01); *B29L 2023/00* (2013.01); *B29L 2031/755* (2013.01)

(58) Field of Classification Search
CPC ........ B01D 71/32; B01D 71/34; B01D 71/36; B01D 71/38; B01D 71/76; B29C 47/0004; B29C 47/0014; B29C 47/0026; B29C 48/022; B29C 48/05; B29C 48/10; B29K 2027/16; B29L 2023/00; B29L 2031/755; D01D 5/247; D01F 1/08; D01F 6/12

See application file for complete search history.

(56) References Cited

U.S. PATENT DOCUMENTS

| | | |
|---|---|---|
| 5,552,208 A | 9/1996 | Lin et al. |
| 6,013,688 A | 1/2000 | Pacheco et al. |
| 6,017,455 A | 1/2000 | Shimoda et al. |
| 6,074,718 A | 6/2000 | Puglia et al. |
| 6,110,309 A | 8/2000 | Wang et al. |
| 6,682,652 B2 | 1/2004 | Mahendran et al. |
| 7,338,692 B2 | 3/2008 | Smith et al. |
| 7,445,772 B2 | 11/2008 | Tada et al. |
| 7,780,014 B2 | 8/2010 | Tada et al. |
| 8,182,908 B2 | 5/2012 | Mrozinski |
| 8,512,627 B2 | 8/2013 | Wang et al. |
| 8,663,868 B2 | 3/2014 | Smith et al. |
| 2003/0038075 A1 | 2/2003 | Akimoto et al. |
| 2007/0106010 A1 | 5/2007 | Hedhli et al. |
| 2009/0206035 A1 | 8/2009 | Takahashi et al. |
| 2011/0017661 A1 | 1/2011 | Kosar |
| 2013/0031260 A1 | 1/2013 | Jones |
| 2014/0144833 A1 | 5/2014 | Kosar |
| 2014/0296437 A1 | 10/2014 | Hatae et al. |
| 2016/0008772 A1 | 1/2016 | Kosar et al. |

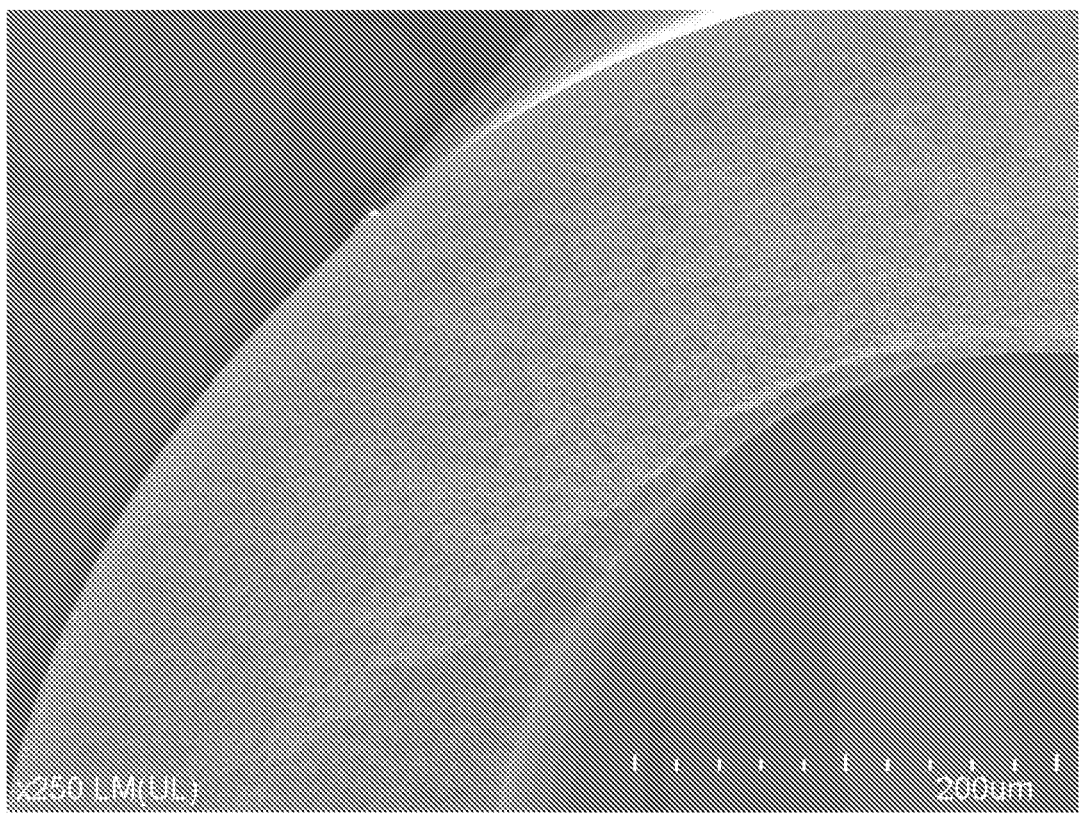

HIGH TOUGHNESS HOLLOW FIBER MEMBRANES BASED ON VINYLIDENE FLUORIDE POLYMERS

This application claims benefit, under U.S.C. § 119 or § 365 of PCT Application. Number PCT/US2015/041219, filed Jul. 21, 2015; and U.S. Provisional Applications No. 62/027,367, filed Jul. 22, 2014, 6; said applications incorporated herein by reference.

FIELD OF THE INVENTION

The invention pertains to vinylidene fluoride polymer-based formulations useful for the preparation of hollow fiber membranes having improved toughness.

DISCUSSION OF THE RELATED ART

Polyvinylidene fluoride (PVDF) resin has become a preferred material for the preparation of water treatment membranes by virtue of its high purity, regulatory approvals, and resistance to many of the oxidants and cleaning chemicals used in this application. Hollow fiber membranes are generally preferred in membrane applications because of their higher surface area per unit volume, which allows for smaller, more efficient filtration modules. Hollow fiber membranes are also well suited for submerged filtration modules used in membrane bioreactors (MBRs). MBR systems are also one of the fastest growing parts of the water treatment market worldwide.

A major challenge in the commercial development of hollow fiber membranes is fiber breakage. Fiber breakage leads to loss of integrity within the module and the potential for contamination breakthrough. When fibers break, the module must be removed from service, the broken fiber located visually, and then plugged. This can be a very time consuming and costly process.

Concerns about hollow fiber membrane integrity are a major impediment to wide adoption of this important technology. Improving mechanical properties, and particularly reducing fiber breakage, is an important target for many membrane companies.

A key distinguishing factor is how to measure or grade mechanical properties of these membranes. Usually, a tensile test is done to determine elongation to break and strain at break. Unfortunately, this test is not really indicative of the real life mechanical stresses to which membranes are subject. More often, membranes are subject to back and forth motions from turbulent water flow and backflush cycles. This stress more closely resembles flexural fatigue than uniaxial elongation. Another damaging stress which membranes encounter is impingement of solid abrasive particles present in the feedwater. Resistance to nicks and cuts is another property that would greatly improve hollow fiber membrane durability. The ultimate longevity of an unsupported hollow fiber membrane is determined by the toughness, or energy to break, of each individual fiber.

BRIEF SUMMARY OF THE INVENTION

One aspect of the invention provides a membrane in the form of a fiber, wherein i) the fiber has a porous wall of a polymeric component enclosing a central hollow space extending the length of the fiber, ii) the polymeric component has a crystallinity as determined by wide angle x-ray diffraction of less than about 35%, iii) the polymeric component is comprised of at least one homopolymer or copolymer of vinylidene fluoride and iv) the membrane has an energy to break of at least about 0.5 J per square mm of membrane cross section. Altering the crystallinity of the polymer formulation used to prepare such membranes has been discovered to increase the toughness of the membranes, thereby reducing fatigue-related breakage in long term use. Thus, the present invention provides a way to increase the toughness of hollow fiber membranes for use in water treatment applications. The crystallinity of the polymeric component is selected such that the energy to break of the hollow fiber membrane prepared therefrom is higher than that of an analogous hollow fiber membrane prepared using a polymeric component having a crystallinity greater than 35%.

The polymeric component may, for example, be selected from the group consisting of:
  a) a polymer which is a copolymer of from about 80% to about 99% by weight of vinylidene fluoride and from about 1% to about 20% by weight of one or more co-monomers;
  b) a blend of from about 10% to about 80% by weight vinylidene fluoride homopolymer and from about 20% to about 90% by weight of a copolymer of from about 60% to about 99% by weight of vinylidene fluoride and from about 1% to about 40% by weight of one or more co-monomers;
  c) a blend of from about 10% to about 80% by weight high crystallinity vinylidene fluoride homopolymer and from about 20% to about 90% by weight low crystallinity vinylidene fluoride homopolymer;
  d) a vinylidene fluoride homopolymer or copolymer containing long chain branching; and
  e) a vinylidene fluoride copolymer containing a fraction of very high molecular weight polyvinylidene fluoride homopolymer or copolymer.

The polymeric component may have a crystallinity as determined by wide angle x-ray diffraction of at least about 20%.

In one exemplary embodiment, the polymeric component is a polymer which is a copolymer of from about 80% to about 99% by weight of vinylidene fluoride and from about 1% to about 20% by weight of one or more co-monomers selected from the group consisting of hexafluoropropylene, chlorotrifluoroethylene, tetrafluoroethylene, trifluoroethylene, vinylacetate, vinylsulfonic acid, vinyltrimethylsilane, tetrafluoropropylene, acrylic acid and methacrylic acid. The polymeric component may be a mixture of two or more different such copolymers, provided that the copolymers in combination meet the crystallinity criteria in accordance with the invention.

In another exemplary embodiment, the polymeric component is a blend of from about 10% to about 80% by weight vinylidene fluoride homopolymer and from about 20% to about 90% by weight of a copolymer of from about 60% to about 99% by weight of vinylidene fluoride and from about 1% to about 40% by weight of one or more co-monomers selected from the group consisting of hexafluoropropylene, chlorotrifluoroethylene, tetrafluoroethylene, trifluoroethylene, vinylacetate, vinylsulfonic acid, vinyltrimethylsilane, tetrafluoropropylene, acrylic acid and methacrylic acid.

In still another embodiment of the invention, the polymeric component is a blend of from about 10% to about 80% by weight of a first vinylidene fluoride homopolymer having a degree of crystallinity of greater than 35% and from about 20% to about 90% by weight of a second vinylidene fluoride homopolymer having a degree of crystallinity of less than 20%.

The polymeric component, in another embodiment, is a blend of vinylidene fluoride homopolymer or copolymer and methyl methacrylate homopolymer or copolymer.

The porous wall of the membrane may be substantially free or entirely free of macrovoids. As used herein, the term "macrovoids" means voids having a diameter larger than 10 microns in any one direction, it being understood that macrovoids can be, for example, spherical or elongated in shape. For instance, a void which is elongated in shape, 2 to 5 microns in width, and 100 microns in length (thus being "fingerlike" in form and extending through the wall of the membrane) would be considered a macrovoid.

The membrane may be supported or unsupported. The improved toughness of the hollow fiber membranes of the present invention provides enhanced mechanical integrity, thereby facilitating the fabrication of unsupported membranes capable of better withstanding the stresses the membranes may experience during use.

Additionally provided by the present invention is a membrane module, wherein i) the membrane module comprises a plurality of hollow porous fibers of a polymeric component, ii) the polymeric component has a crystallinity as determined by wide angle x-ray diffraction of less than about 35%, iii) the polymeric component is comprised of at least one homopolymer or copolymer of vinylidene fluoride and iv) the membrane has an energy to break of at least about 0.5 J per square mm of membrane cross section. The polymeric component may be selected from the group consisting of:
  a) a polymer which is a copolymer of from about 80% to about 99% by weight of vinylidene fluoride and from about 1% to about 20% by weight of one or more co-monomers;
  b) a blend of from about 10% to about 80% by weight vinylidene fluoride homopolymer and from about 20% to about 90% by weight of a copolymer of from about 60% to about 99% by weight of vinylidene fluoride and from about 1% to about 40% by weight of one or more co-monomers;
  c) a blend of from about 10% to about 80% by weight high crystallinity vinylidene fluoride homopolymer and from about 20% to about 90% by weight low crystallinity vinylidene fluoride homopolymer;
  d) a vinylidene fluoride homopolymer or copolymer containing long chain branching; and
  e) a vinylidene fluoride copolymer containing a fraction of very high molecular weight polyvinylidene fluoride copolymer or homopolymer.

A method of making a hollow porous fiber useful in manufacturing membrane modules is furnished in another aspect of the invention, wherein the method comprises:
  a) extruding a composition comprised of a polymeric component, a pore enhancement agent and a solvent capable of dissolving the polymeric component and the pore enhancement agent to form a hollow fiber; and
  b) removing the solvent and pore enhancement agent from the hollow fiber to form the hollow porous fiber.

The polymeric component is selected to have a crystallinity as determined by wide angle x-ray diffraction of less than about 35% and is comprised of at least one homopolymer or copolymer of vinylidene fluoride. The pore enhancement agent may be miscible with or soluble in water. The solvent and pore enhancement agent may be removed from the hollow fiber by soaking the hollow fiber in water. The solvent may be water miscible and may be selected from the group consisting of amides, ketones, carbonates, ethers, ureas, trialkyl phosphates, esters, dimethylsulfoxide, hexamethylphosphoramide and combinations thereof.

Thus, the present invention further provides a mixture useful for forming hollow fiber membranes, wherein the mixture is comprised of a polymeric component, a pore enhancement agent and a solvent capable of dissolving the polymeric component and the pore enhancement agent, the polymeric component being comprised of at least one homopolymer or copolymer of vinylidene fluoride and having a crystallinity as determined by wide angle x-ray diffraction of less than about 35%. X-ray analysis is completed using a wide angle x-ray equipment. The equipment is made by Rigaku Ultima 2+. The samples were analyzed in theta-theta conditions on the standard stage in the following conditions: Cu K α (40 kV, 40 mA), Range 2® [theta]=2 to 90°, dwell time=5 s, step size=0.02°. Crystallinity, expressed in percents, was determined by ratio of the crystalline peaks to the total scattered intensity (crystalline+ amorphous peaks). A baseline was first drawn to separate instrumental background from sample background. Crystalline reflections were constrained at peak positions defined by PVDF crystallographic structure (either α PVDF, β PVDF, or γ PVDF as dictated by sample crystal structure composition).

Also provided by the present invention is a method of making a membrane module, wherein the method comprises forming a bundle of membranes which are in accordance with any of the above-mentioned embodiments (i.e., bundling a plurality of such hollow fiber membranes).

BRIEF DESCRIPTION OF THE DRAWING

FIG. 1 is an SEM image of the macrovoid-free membrane structure prepared with the copolymer of Example 2.

DETAILED DESCRIPTION OF CERTAIN EMBODIMENTS OF THE INVENTION

According to the present invention, a hollow fiber membrane is constructed from a mixture containing a PVDF-based polymeric component (comprised of at least one homopolymer or copolymer of vinylidene fluoride) which is processed using known spinneret technology. This mixture (sometimes referred to as a "membrane dope") can be of any suitable form, including a solution or a suspension having solids dispersed uniformly throughout. In one embodiment, the selected form of the mixture is a solution, which is initially prepared by combining the polymeric component with at least one solvent and at least one pore enhancement agent. Preferred polymeric components useful in this invention are described below in more detail. The quantity of polymeric component in the mixture used to form the hollow fiber membrane can range from about 5% to about 50% by weight. In one embodiment, the mixture contains from about 10% to about 30% by weight polymeric component.

In accordance with the present invention, the polymeric component has a crystallinity as determined by wide angle x-ray diffraction (WAXD) of less than about 35%. The crystallinity of the polymeric component is measured before it is incorporated into a hollow fiber membrane. That is, the crystallinity values described herein refer to the crystallinity of the polymeric component starting material (which may be a single polymer or mixture/blend of two or more different polymers). In certain embodiments, the crystallinity of the polymeric component is less than about 34%, less than about 33%, less than about 32%, less than about 31%, or less than about 30%. In other embodiments, the polymeric component has a crystallinity of at least about 10%, at least about 20%, or at least about 25%. In one embodiment, however, the polymeric component may be amorphous (0% crystallinity). Controlling the crystallinity of the polymeric component has been found to enhance the toughness of the hollow fiber membranes prepared using the polymeric component; fatigue-related breakage of the fibers during long term usage is thereby reduced.

The degree of crystallinity of the polymeric component, as well as the composition of the polymeric component, are selected to provide a hollow fiber membrane having an energy to break of at least about 0.5 J per square mm of membrane cross section. The energy to break of a hollow fiber membrane may be measured by calculating the area under the stress-strain curve. In all the examples presented herein, unsupported hollow fiber membranes were tested in tension with a grip spacing of 100 mm and a strain rate of 100 mm·min$^{-1}$. In various embodiments of the invention, the energy to break of the hollow fiber membrane may be at least about 0.51 J, at least about 0.52 J, at least about 0.53 J, at least about 0.54 J, at least about 0.55 J, at least about 0.56 J, at least about 0.57 J, at least about 0.58 J, at least about 0.59 J, or at least about 0.60 J per square mm of membrane cross section.

As previously mentioned, the polymeric component is comprised of at least one homopolymer or copolymer of vinylidene fluoride. The polymeric component, in certain embodiments of the invention, consist essentially of or consist of at least one homopolymer or copolymer of vinylidene fluoride. In certain embodiments, only one type of polymer is present in the polymeric component. In other embodiments, however, the polymeric component contains two or more different types of polymers. The polymer or polymers in the polymeric component is or are selected so as to provide a polymeric component having the desired level of crystallinity, which has been found to affect the "toughness" of the hollow fiber membranes produced therefrom.

The polymeric component may, for example, be a single vinylidene fluoride-based resin, or a blend of two or more different vinylidene fluoride-based resins. The vinylidene fluoride may be copolymerized with one or more co-monomers that reduce the crystallinity of the polymer thereby obtained, while still maintaining proper molecular weight and viscosity for membrane applications.

Without wishing to be bound by theory, modification of the polymer structure is thought to disrupt the regularity of the vinylidene fluoride polymer chains, which reduces the size of ordered crystallites that may form. Smaller crystallites, along with lower overall crystallinity, will create a more durable porous structure during membrane fabrication. Larger spherulite structures are believed to be capable of serving as defect points within a membrane, ultimately leading to failure of the membrane. The present invention provides hollow fiber membranes with smaller, more dispersed crystallites that reduce the incidence of such defects.

Examples of polymeric components suitable for use in the present invention include, but are not limited to:
  a) a polymer which is a copolymer of from about 80% to about 99% by weight of vinylidene fluoride and from about 1% to about 20% by weight of one or more co-monomers;
  b) a blend of from about 10% to about 80% by weight vinylidene fluoride homopolymer and from about 20% to about 90% by weight of a copolymer of from about 60% to about 99% by weight of vinylidene fluoride and from about 1% to about 40% by weight of one or more co-monomers;
  c) a blend of from about 10% to about 80% by weight high crystallinity vinylidene fluoride homopolymer and from about 20% to about 90% by weight low crystallinity vinylidene fluoride homopolymer;
  d) a vinylidene fluoride homopolymer or copolymer containing long chain branching; and
  e) a vinylidene fluoride copolymer containing a fraction of very high molecular weight vinylidene fluoride homopolymer or copolymer.

Vinylidene Fluoride Copolymers

In one embodiment of the invention, a polymer is utilized which is a copolymer of vinylidene fluoride (VDF) and one or more co-monomers. For example, the copolymer may comprise from about 60% to about 99% by weight of vinylidene fluoride and from about 1% to about 40% by weight of one or more co-monomers or from about 80% to about 99% by weight of vinylidene fluoride and from about 1% to about 20% by weight of one or more co-monomers. The co-monomer may be a fluoromonomer, for example. The term fluoromonomer denotes any compound containing a vinyl group capable of being polymerized and that contains, directly attached to this vinyl group, at least one fluorine atom, at least one fluoroalkyl group or at least one fluoroalkoxy group. Examples of fluoromonomers suitable for copolymerization with vinylidene fluoride to form a vinylidene fluoride copolymer include, but are not limited to vinyl fluoride; trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE); perfluoro(propyl vinyl) ether (PPVE); perfluoro(1,3-dioxole); and perfluoro(2,2-dimethyl-1,3-dioxole) (PDD).

Copolymers (including terpolymers and higher polymers) of vinylidene fluoride may be made by reacting vinylidene fluoride with up to 20 weight percent of one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol. The co-monomer may be a nonfluorinated monomer such as ethene, propene, vinylacetate, vinylsulfonic acid, vinyltrimethylsilane acrylic acid or methacrylic acid.

In one embodiment, the vinylidene fluoride copolymer is a copolymer of from about 80% to about 99% by weight of vinylidene fluoride and from about 1% to about 20% by weight of one or more co-monomers selected from the group consisting of hexafluoropropylene, chlorotrifluoroethylene, tetrafluoroethylene, trifluoroethylene, vinylacetate, vinylsulfonic acid, vinyltrimethylsilane, tetrafluoropropylene, acrylic acid and methacrylic acid.

Vinylidene fluoride copolymers useful in the present invention are available from commercial sources, including, for example, the copolymers sold under the brand name "Kynar" by Arkema such as Kynar® 2851 and Kynar® LBG.

Blends of Vinylidene Fluoride Homopolymers and Vinylidene Fluoride Copolymers

In another embodiment of the invention, the polymeric component is a blend of one or more vinylidene fluoride homopolymers and one or more vinylidene copolymers, such as a blend of from about 10% to about 80% by weight vinylidene fluoride homopolymer and from about 20% to about 90% by weight of a copolymer of from about 60% to about 99% by weight of vinylidene fluoride and from about 1% to about 40% by weight of one or more co-monomers.

Vinylidene fluoride homopolymers are well known in the art and may be prepared using any suitable method, provided that the homopolymer (when blended with the vinylidene fluoride copolymer) provides a polymeric component that meets the crystallinity requirements of the present invention. Suitable vinylidene fluoride homopolymers are readily available from commercial sources, including the vinylidene fluoride homopolymers sold under the brand name "Kynar" by Arkema. Methods of making vinylidene fluoride homopolymers are described, for example, in U.S. Pat. Nos. 4,569,978; 6,794,264; and 6,512,063 and U.S. Pat. Application Pub. Nos. 2007/0270534 and 2013/0079461, each of which is incorporated herein by reference in its entirety for all purposes.

Suitable vinylidene fluoride copolymers for blending with vinylidene fluoride homopolymer to provide the polymeric component may be any of the copolymers described previously. The vinylidene fluoride copolymer may be prepared using any of the procedures known in the art, including adaptation of the polymerization methods in the patents and patent applications mentioned above in connection with vinylidene fluoride homopolymerization.

Blends of High Crystallinity Vinylidene Fluoride Homopolymer and Low Crystallinity Vinylidene Fluoride Homopolymer In another embodiment, the polymeric component is a blend of a high crystallinity vinylidene fluoride homopolymer and a low crystallinity vinylidene fluoride homopolymer, with the relative proportions of each being selected to provide a polymeric component having the desired degree of crystallinity (i.e., less than about 35%). For example, the blend may be a blend of from about 10% to about 80% by weight high crystallinity vinylidene fluoride homopolymer and from about 20% to about 90% by weight low crystallinity vinylidene fluoride homopolymer. As used herein, "high crystallinity" means greater than 35% crystallinity as measured by wide angle x-ray diffraction and "low crystallinity" means a crystallinity of 35% or less as measured by wide angle x-ray diffraction. The low crystallinity vinylidene fluoride homopolymer may have, for example, a crystallinity of less than 30%, less than 25% or less than 20%.

Lower crystallinity in polyvinylidene fluoride homopolymers may be achieved by carrying out the polymerization of vinylidene fluoride at higher temperatures, to increase the number of reverse unit defects and/or increase the degree of branching in the resulting homopolymer.

Vinylidene Fluoride Homopolymer or Copolymer Containing Long Chain Branching

A vinylidene fluoride homopolymer or copolymer containing long chain branching may also be used as the polymeric component. Without wishing to be bound by theory, the branch points are believed to disrupt crystallinity in the main chain of the polymer. The long chain branching is thought to maintain good polymer entanglements and can be used to strain-harden the hollow fiber membranes without overly increasing crystallinity. Such polymers are known in the art and may be prepared by any suitable method. Long chain branched fluoropolymers have been produced by reversible chain transfer based on iodine, as described in Macromolecular Symposia (2004), 206(Polymer Reaction Engineering V), 347-360 and US 2004-0192868; by a transfer-to-polymer mechanism producing trifunctional long-chain branches (Macromolecules (2000), 33(5), 1656-1663); and through the use of low levels of radiation as disclosed in US patent application 2006-0287409. Another method to produce long-chain branched fluoropolymers is disclosed in US Pat. Application Pub. No. 2007/010610. Each of the aforementioned publications is incorporated herein by reference in its entirety for all purposes. As used herein "long chain branching" means that the average branch is larger than the critical molecular weight between entanglements. For a polyvinylidene fluoride polymer, this would be about 2,500 g/mole.

In one embodiment, the polymer containing long chain branching is a homopolymer of vinylidene fluoride. However, the polymer may alternatively be a copolymer of vinylidene fluoride and one or more other comonomers, such as a fluoromonomer other than vinylidene fluoride. The term fluoromonomer denotes any compound containing a vinyl group capable of being polymerized and that contains, directly attached to this vinyl group, at least one fluorine atom, at least one fluoroalkyl group or at least one fluoroalkoxy group. Examples of suitable fluoromonomers include, but are not limited to vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE); perfluoro(propyl vinyl) ether (PPVE); perfluoro(1,3-dioxole); and perfluoro(2,2-dimethyl-1,3-dioxole) (PDD).

The polymers containing long chain branching useful as the polymeric component in forming the hollow fiber membranes of the invention are those in which vinylidene fluoride units comprise greater than 40 percent of the total weight of all the monomer units in the polymer, and more preferably, comprise greater than 70 percent of the total weight of the units, and may comprise greater than 75 and even greater than 80 weight percent of all monomers. Copolymers (including terpolymers and higher polymers) of vinylidene fluoride may be made by reacting vinylidene fluoride with up to 30 weight percent of one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol. The co-monomer may be a non-fluorinated monomer, such as ethene, propene, vinylacetate, vinylsulfonic acid, vinyltrimethylsilane acrylic acid or methacrylic acid.

The polymer having long chain branching preferably is a gel-free polymer. By "gel-free", as used herein, is meant that the fluoropolymer contains less than 5 weight percent gels, preferably less than 2 weight percent gels, and most preferably less than 1 weight percent gels, based on the total weight of polymer. By gel is meant the fraction of polymer that is not soluble under standard solubilization conditions in conventional fluoropolymer solvents such as acetone, n-methyl pyrrolidone (NMP), or dimethylsulfoxide (DMSO), and N,N-dimethylformamide, (DMF). A gel-free polymer will produce a visually clear (not hazy) solution in any of the above solvents. The gel fraction is defined as the fraction of polymer retained after filtering through a 5 μm filter and standard gel permeation chromatography column.

The amount of long chain branching and the molecular weight of the vinylidene fluoride homopolymer or copolymer can be controlled, as known in the art, such as by adjusting the temperature, type of initiator(s), initiator feed rate, and catalyst, or post-polymerization radiation. The weight average molecular weight of the polymer having long chain branching is in the range of 20,000 to 2,000,000 g/mol, preferably 100,000 to 1,000,000 g/mol and most preferably from 500,000 to 800,000 g/mol.

The polymer having long chain branching used in the invention is generally prepared by means known in the art, using aqueous free-radical emulsion polymerization—although suspension, solution and supercritical $CO_2$ polymerization processes may also be used. In a general emulsion polymerization process, a reactor is charged with deionized water, water-soluble surfactant capable of emulsifying the reactant mass during polymerization and optional paraffin wax antifoulant and catalyst. The mixture is stirred and deoxygenated. A predetermined amount of chain transfer agent, CTA, is then introduced into the reactor, the reactor temperature raised to the desired level and vinylidene fluoride (and possibly one or more comonomers) are fed into the reactor. Once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to do so. Typically the temperature will be from about 30° to 150° C., preferably from about 60° to 120° C. Once the desired amount of polymer has been reached in the reactor, the monomer feed will be stopped, but initiator feed is optionally continued to consume residual monomer. Residual gases (containing unreacted monomers) are vented and the latex recovered from the reactor.

The surfactant used in the polymerization can be any surfactant known in the art to be useful in PVDF emulsion polymerization, including perfluorinated, partially fluorinated, and non-fluorinated surfactants. Preferably the emulsion is fluorosurfactant free, with no fluorosurfactants being used in any part of the polymerization.

The long chain branched polymer useful in the present invention has a radius of gyration that is less than the radius of gyration of a similar composition linear vinylidene fluoride homopolymer or copolymer of the same weight average molecular weight, as measured by multi angle light scattering.

Vinylidene Fluoride Copolymer Containing a Fraction of Very High Molecular Weight Vinylidene Fluoride Homopolymer or Copolymer The polymeric component utilized in the present invention may also be a vinylidene fluoride copolymer containing a fraction of very high molecular weight vinylidene fluoride homopolymer or copolymer. Resins containing a very high molecular weight vinylidene fluoride homopolymer or copolymer suitable for use in the present invention are described, for example, in U.S. Pat. Application Pub. No. 2009-0203864, incorporated herein by reference in its entirety for all purposes. Such a polymeric component may be directly synthesized using polymerization conditions which lead to the generation of the desired proportion of very high molecular weight vinylidene fluoride homopolymer or copolymer. Alternatively, a blend of very high molecular weight vinylidene fluoride homopolymer or copolymer with lower molecular weight vinylidene fluoride copolymer may be employed. As used herein, "very high molecular weight" means a weight average molecular weight (Mw) of greater than 580,000 g/mole and a number average molecular weight (Mn) of greater than 220,000 g/mole. The molecular weight is measured using a size exclusion chromatography (SEC) analyses performed with a Waters chromatographic system comprising an Alliance 2695 and a differential refractometer model 2414. The column oven was set at 50° C., the differential refractometer cell at 35° C. Two PL gel mixed B columns were used. DMSO with 0.1M $NaNO_3$ was the eluent and the flow rate was 1.0 mL/min. The sample was prepared in DMSO at 2 g/L and filtered with 0.45 micron PTFE filters. For the calibration, we used the MW and MN values relative to PMMA. As used herein, "low molecular weight" means a weight average molecular weight (Mw) of less than 580,000 g/mole and a number average molecular weight (Mn) of less than 220,000 g/mole. The Mw and Mn are measured by size exclusion chromatography. In one embodiment, a single polymerization of vinylidene fluoride, optionally in combination with one or more additional comonomers, can be performed resulting in a bimodal distribution having a very high molecular weight portion and a low molecular weight portion, with molecular weights within the ranges above. In various aspects of the invention, the very high molecular weight vinylidene fluoride homopolymer or copolymer is soluble in N-methyl pyrrolidone (NMP) at 20° C. and when dissolved at 10 weight % in NMP has a solution viscosity of greater than 35 Pa-s, greater than 45 Pa-s, or greater than 50 Pa-s measured at $0.1\ s^{-1}$. The very high molecular weight fraction is thought to be capable of acting as an intrinsic filler within the hollow fiber membrane matrix and helping to improve the toughness of the membrane. Such membranes are expected to be more durable than membranes prepared using only lower molecular weight vinylidene fluoride-based polymers.

The level of the very high molecular weight polymer in the polymeric component may be between 1 and 99 percent by weight, preferably from 20 to 80 percent by weight and more preferably from 30 to 70 percent by weight, with the level of the lower molecular weight polymer between 99 and 1 weight percent, preferably from 80 to 20 weight percent, and more preferably from 70 to 30 weight percent.

The polyvinylidene fluoride resin composition for both the high and low molecular weight fractions may be the same or different. The high molecular weight fraction may be a homopolymer made by polymerizing vinylidene fluoride (VDF), a copolymer (including a terpolymer or higher polymer) of vinylidene fluoride wherein the vinylidene fluoride units comprise greater than 70 percent of the total weight of all the monomer units in the polymer, and more preferably, comprise greater than 75 percent of the total weight of the units. Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, hexafluoropropene, trifluoromethyl-methacrylic acid, trifluoromethyl methacrylate, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP) and vinyl acetate. While an all fluoromonomer containing copolymer is preferred, non-fluorinated monomers such as vinyl acetate, vinylsulfonic acid, vinyltrimethylsilane methacrylic acid, and acrylic acid, may also be used to form copolymers, at levels of up to, for example, 15 weight percent based on the polymer solids.

Exemplary suitable copolymers include: copolymers comprising from about 71 to about 99 weight percent VDF, and correspondingly from about 1 to about 29 percent TFE; copolymers comprising from about 71 to 99 weight percent VDF, and correspondingly from about 1 to 29 percent HFP (such as those disclosed in U.S. Pat. No. 3,178,399); and copolymers comprising from about 71 to 99 weight percent VDF, and correspondingly from about 1 to 29 weight percent trifluoroethylene.

Examples of suitable terpolymers include the terpolymer of VDF, HFP and TFE, and the terpolymer of VDF, trifluoroethene, and TFE. In certain embodiments of the invention, the terpolymers have at least 71 weight percent VDF, and the other comonomers may be present in varying portions, but together they comprise up to 29 weight percent of the terpolymer.

There are many acceptable solvents which can be used in the preparation of the mixtures (membrane dopes) used to manufacture hollow fiber membranes in accordance with this invention. The solvents can be either protic or aprotic. In one embodiment, the solvent is water miscible. Suitable solvents are those which are capable of dissolving the polymeric component, and are also capable of dissolving the pore enhancement agent, although it is not necessary for the pore enhancement agent and the polymeric component to have the same solubility. The solvents can, for example, be amides such as dimethylformamide, N,N-dimethylacetamide, N,N-diethylacetamide, N-ethyl pyrrolidone, N-octyl pyrrolidone and N-methyl pyrrolidone; ketones such as acetone, methyl ethyl ketone and 2-butanone; carbonates such as dimethylcarbonate, diethylcarbonate, propylene carbonate and ethylene carbonate; ethers such as tetrahydrofuran; triethyl phosphate; gamma-buyrolactone; ureas such as tetramethyl urea and N,N'-dimethyl-trimethylene urea; esters; dimethyl sulfoxide; hexamethylphosphoramide; and mixtures thereof. Of course, other solvents capable of dissolving the polymeric component and/or pore enhancement agent are also useful in this invention. It will be apparent to one skilled in the art that the selection of the appropriate solvent, as well as the concentration of the solvent, will be one factor in determining the characteristics, including pore size, of the end product membrane. The solvent may, for example, comprise from about 40% to about 85% by weight of the mixture also comprising the polymeric component.

The pore enhancement agent included in the mixture with the solvent and polymeric component is selected primarily on the basis of the desired pore size or pore size distribution to be achieved in the end product hollow fiber membrane. In one embodiment of the present invention, the pore enhancement agent is soluble in the solvent. In another embodiment, the pore enhancement agent is miscible with or soluble in water. The pore enhancement agent may be a hydrophilic, water-extractable compound. A wide range of suitable pore enhancement agents are useful in the present invention, including polyvinylpyrrolidone (PVP), polyethylene glycol, polypropylene glycol, glycols such as ethylene glycol, glycerol and propylene glycol, metallic salts (such as lithium, calcium, magnesium and zinc salts), alcohols, poly-2-ethyloxazoline, hydroxyethylcellulose, hydroxymethylcellulose, butylcellosolve, polymethylvinylketone, polymethylmethacrylate, polymethylmethacrylate-co-ethylacrylate, polymethylmethacrylate-co-butylacrylate, polymethymethacrylate-co-butylacrylate-co-hydroxyethylmethacrylate, polymethylmethacrylate-co-butylacrylate-co-methoxypolyethyeleneglycol-methacrylate, polymethylmethacrylate-co-methacrylic acid, polymethylmethacrylate-co-butylacrylate-co-methacrylic acid, polymethylmethacrylate-co-aminopropane sulfonic acid, polystyrene sulfonic acid and polymethylmethacrylate-co-aminopropanesulfonic acid sodium salt. One skilled in the art will recognize that there are a large variety of other pore enhancement agents acceptable for use in this invention. According to the present invention, the mixture may contain from about 1% to about 25% by weight of the pore enhancement agent, depending primarily on the pore sizes to be formed. In another embodiment, the amount of pore enhancement agent ranges from about 10% to about 20% by weight.

Without wishing to be bound by theory, the pore enhancement agent is thought to act essentially as a space filler when admixed with the polymeric component, and is leached out of the extruded fiber during the coagulation process. After the agent is diffused through the walls of the extruded fiber, the pockets or areas previously occupied by the pore enhancement agent become pores within the membrane. Although pores may form in the fiber even in the absence of a pore enhancement agent, the presence of the pore enhancement agent in the mixture being extruded generally helps to enhance pore formation and also influences the size, uniformity and geometry of the pores. The speed of the diffusion is one of the variable factors used to determine the ultimate size and size distribution of the pores. For example, a slower rate of diffusion provides the membrane with additional time to solidify around the agent before it is completely removed, thereby forming more controlled pore sizes than when the agent is more rapidly diffused. The desired rate of diffusion can be selected by varying a number of factors known to one skilled in the art. According to the process of the present invention, one such factor is the addition of solvent to the bore fluid and/or the coagulation bath, as is set forth in more detail below. The pore sizes achieved in the hollow fiber membranes of the present invention can, for example, range from about 0.003 to about 1 micron in diameter, with the pore sizes ranging from about 0.01 to about 1 micron in diameter in one embodiment of the invention. In addition to assisting in the pore formation of the membrane, the pore enhancement agent may also help to process the polymeric component into the polymer solution or other mixture.

In preparing the mixture of polymeric component, solvent and pore enhancement agent, one suitable method involves first mixing the pore enhancement agent into the solvent until it is totally dispersed therein. Under high or low shear conditions, the polymeric component is then added and mixed into the mixture. Mixing may be continued for a suitable period of time, e.g., from about 1 to about 8 hours, at a suitable temperature, e.g., from about 40° C. to about 100° C. Following such mixing, the mixture may be allowed to sit to degas; the temperature during this degassing step may be maintained at about 40° C. to about 100° C., for example.

Subsequent to degassing, the mixture containing the polymeric component may be introduced into a conventional spinning apparatus, or spinneret, such as a tube-in-orifice type spinneret which produces a hollow fiber extrudate. This spinneret has an inner chamber communicating with the outer portion of the spinneret housing, the chamber having a hollow tube secured therein. The fiber forming mixture to be spun from the spinneret is supplied to the nozzle block, or annular space defined by the outer wall of the tube and the inner wall of the chamber. The lumen of the hollow tube generally carries a bore fluid which is co-extruded with the fiber forming material. According to the method of the present invention, the mixture containing the polymeric component as defined herein is delivered to the nozzle block of the spinneret, with the temperature of the mixture as it is extruded being maintained in a suitable range such as from about 30° C. to about 90° C. The bore fluid is then delivered to the hollow tube positioned therein. The fiber forming mixture is extruded through the annular space described above to form a hollow core extrudate, and the bore fluid is co-extruded therewith from the hollow tube of the spinneret.

The bore fluid generally comprises water, and preferably comprises a mixture of water and a portion of the same solvent initially used as the solvent in the mixture containing the polymeric component. The bore fluid may also comprise a pore enhancement agent, which may be the same pore enhancement agent used in the initial mixture containing the polymeric component. The function of the bore fluid is to assist in the formation of the fibers from the inside out, whereby the inner wall of the fiber begins to coagulate as it comes into contact with the bore fluid. The solvent which is present in the bore fluid slows the coagulation process by preventing what might otherwise be essentially instantaneous coagulation. In addition, as the bore fluid passes through the lumen of the fiber, it also dissolves some of the pore enhancement agent and removes it from the polymer mixture, thereby assisting in the creation of the pores.

The polymer mixture and the bore fluid are co-extruded through the spinneret as described above, and the hollow fiber thus formed is spun into a gravity-fed coagulation bath where the formation of the membrane is ultimately completed. In certain circumstances, it may be desirable for the extruded fiber to pass through the air for a predetermined distance before entry into the coagulation bath, although it can also be extruded directly into the bath. When it is desired that the fiber contact the air prior to entry into the coagulation bath, the appropriate distance between the nozzle of the spinneret and the surface of the bath is determined by the time and distance necessary for the bore fluid to begin permeating from the lumen of the fiber through the outer wall thereof, which permeation should occur prior to entry of the fiber into the bath.

As with the bore fluid, the fluid in the coagulation bath generally comprises water, and preferably comprises a mixture of water and a portion of the same solvent used in the polymeric component-containing mixture. A portion of the same pore enhancement agent used in the polymeric-component containing mixture may also be present. The temperature of the coagulation bath can range from sub-ambient to higher than ambient temperatures, e.g., 0 to 100° C., with a preferable temperature range of 40-80° C., and a most preferable temperature ranges of 50-70° C. Control of the coagulation bath temperature helps control pore size on the outer skin of the membrane wall and can be adjusted as may be desired in order to achieve specific pore size ranges.

The pore sizes of the hollow fiber membranes can be measured by any of a number of conventional methods. One such method utilizes molecular weight markers, whereby beads having selected diameters are passed through the membrane, and the percentage of beads which pass through is recorded.

Subsequent to the coagulation bath, the fibers are leached in a water bath for a period of time effective to remove substantially all of the remaining solvent from the fibers (typically, about 6 to about 24 hours). This leaching step may be carried out at elevated temperatures (e.g., in boiling or hot water) and/or in the presence of reagents such as chlorine bleach to enhance removal of the pore enhancement agent(s). In another process to remove the pore enhancement agent(s), organic solvents such as alcohols may be used to soak the fibers and extract the pore enhancement agent(s). After leaching, the fibers may be dried, for example, by drying in an oven maintained at a temperature of from about 20° C. to about 50° C. for a suitable period of time, e.g., 12 to 48 hours, after which time the fibers are stored and ready for use. In a more preferable approach, the fibers are treated with solutions of hydrophilic wetting agents such as glycerol, polyethylene glycol or hydroxymethylcellulose, prior to drying to allow the fibers to be easily rewetted.

As is known in the industry, fibers spun using a spinneret such as is described above can have wall thicknesses and outer diameters according to the specifications of the spinneret utilized. According to the present invention, the hollow fiber wall thickness can be widely varied, and is preferably in the range of about 5 to about 15 mils. The outer diameter measurement can also vary widely, and preferably ranges from about 10 to about 750 mils. It is understood that these values can easily be varied to achieve the desired properties of the end product membrane.

Hollow fiber membranes in accordance with the invention may be assembled in hollow fiber membrane modules by adaptation of any of such assembly techniques or methods known in the art. Procedures for fabricating such modules using hollow member fibers are well known and are described, for example, in the following publications, each of which is incorporated herein by reference in its entirety for all purposes: U.S. Pat. Nos. 8,728,316; 8,679,337; 8,636,904; 8,307,991; 8,225,941; 8,042,695; 7,749,381; 7,704,393; 7,316,754; 7,160,455; 6,682,652; and 6,331,248; U.S. Pat. Application Pub. No. 2003/0038075; and Mat et al., Current Opinion in Chemical Engineering, Vol. 4, May 2014, pp. 18-24.

The hollow fiber membranes of the present invention may be utilized in supported or unsupported form. For example, an unsupported membrane may be a hollow fiber membrane without a woven or nonwoven support. In an unsupported membrane (which may also be referred to as a self-supporting membrane), the hollow fiber membrane itself is both the filtration and structural component. The improved toughness of the hollow fiber membranes of the present invention, which is achieved through the selection of a polymeric component having relatively low crystallinity, makes such membranes well-suited for use in unsupported form.

Supported hollow fiber membranes may be cast onto hollow braids, be formed into yarns, or have additional fibers embedded in the membranes. The additional fibers provide strength and may be made of any material, such as polyethylene terephthalate (PET), although it is desirable for the hollow fiber membranes to be capable of sticking to the additional fibers. The membrane may have a composite structure comprising an outer filter layer (corresponding to the hollow fiber membrane of the present invention) and an inner support layer (which may have a different composition than the outer filter layer).

EXAMPLES

Comparative Example 1

A membrane dope was prepared by mixing 18% wt. PVDF homopolymer with a degree of crystallinity as measured by x-ray diffraction of greater than 35% buy weight (melt viscosity of approximately 3700 Pa·s as measured by capillary rheometry at at 100 s$^{-1}$, 232° C., a 10% wt. Brookfield solution viscosity of 1.8 Pa·s in N-methylpyrrolidone at 25° C., and a wt. ave. molecular weight of 400,000 g·mol$^{-1}$), 7.5% PVP (polyvinyl pyrrolidone) K90 (1,300,000 g·mol$^{-1}$ wt. ave molecular weight), 7.5% PVP K30 (40,000 g·mol$^{-1}$ wt. ave. molecular weight), 6% poly (ethylene glycol) (400 g·mol$^{-1}$ wt. ave. molecular weight, PEG400), and 61% N,N-dimethylacetamide (DMAc) in an overhead mixer. The components were heated to 70° C. and mixed with moderate agitation for 5 hours until fully dissolved. The membrane dope was then allowed to degas at 70° C. overnight before spinning Unsupported hollow fiber membranes were prepared by extruding the membrane dope through an annular die with an outside diameter of 2 mm and an inside diameter of 0.8 mm. The bore fluid contained a mixture of DMAc, poly(ethylene glycol), and water. The dope and bore fluid extrusion rates were 25 ml·min$^{-1}$ and 8 ml·min$^{-1}$ respectively. The nascent fiber passed through an air gap of approximately 2 cm before entering a coagulation bath containing tap water heated to 60° C. The membranes were then collected on a take up reel partially immersed in water at a rate of 15 m·min$^{-1}$. The membranes were washed thoroughly with room temperature water overnight to extract any remaining solvent before a post treatment soak in a 1.5% NaOCl solution for 5 hours. The leached and post-treated membranes were again washed with room temperature water overnight prior to characterization.

The wet membrane dimensions were measured with a calibrated optical microscope. The tensile properties were measured on a universal test frame equipped with monofilament grips. A grip spacing of 100 mm and a strain rate of 100 mm·min$^{-1}$ were used in all tensile tests. Pure water permeability was measured in dead-end constant pressure mode at 0.5 bar on small modules containing 5, 30 cm loops of membrane.

Example 1

The same dope formulation and spinning conditions as in Comparative Example 1 were used except the PVDF homopolymer was replaced with a PVDF-co-HFP polymer containing about 5% wt % hexafluoropropylene (HFP) (melt viscosity of approximately 4300 Pa·s as measured by capillary rheometry at 100 s$^{-1}$, 232° C., a 10% wt. Brookfield solution viscosity of 1450 Pa·s in N-methylpyrrolidone at 25° C., and a wt. ave. molecular weight of 500,000 g·mol$^{-1}$) and per this invention a crystallinity as measured by X-ray diffraction of less than 35% by weight. Comparative Example 2:

Comparative Example 2

The same processing conditions and PVDF homopolymer as in Comparative Example 1, except the dope contained 20% wt. PVDF, 15% wt. PVP K30, 6% wt. PEG 400 and 59% wt. N-Methyl-2-pyrrolidone (NMP).

Example 2

The same processing conditions and composition as in Comparative Example 2, except that the PVDF homopolymer is replaced with the PVDF-co-HFP polymer according to this invention used in Example 1. These examples demonstrate that use of copolymers (PVDF-co-HFP) results in membrane with improved tensile toughness (Table 1)

TABLE 1

| Membrane | Comp Ex. 1 | Ex. 1 | Comp Ex. 2 | Ex. 2 |
|---|---|---|---|---|
| Starting polymer Crystallinity: | 36.9% | 28.6% | — | — |
| Outside diameter (mm) | 1.34 | 1.45 | 1.40 | 1.35 |
| In side diameter (mm) | 0.67 | 0.85 | 0.80 | 0.75 |
| Pure water Permeability (LMHB) | 630 | 920 | 450 | 620 |
| Tensile strength (MPa) | 2.79 | 2.95 | 4.02 | 3.82 |
| Elongation to break | 172% | 249% | 260% | 310% |
| Energy to break (J) | 0.46 | 0.64 | 0.80 | 1.03 |
| Energy/area (J·mm$^{-2}$) | 0.44 | 0.60 | 0.77 | 1.04 |

What is claimed is:

1. A membrane in the form of a fiber, wherein i) the fiber has a porous wall of a polymeric component enclosing a central hollow space extending the length of the fiber, ii) the polymeric component has a crystallinity as determined by wide angle x-ray diffraction of less than about 35%, iii) the polymeric component is comprised of at least one homopolymer or copolymer of vinylidene fluoride and iv) the membrane has an energy to break of at least about 0.5 J per square mm of membrane cross section.

2. The membrane of claim 1, wherein the polymeric component is selected from the group consisting of:
   a) a polymer which is a copolymer of from about 80% to about 99% by weight of vinylidene fluoride and from about 1% to about 20% by weight of one or more co-monomers;
   b) a blend of from about 10% to about 80% by weight vinylidene fluoride homopolymer and from about 20% to about 90% by weight of a copolymer comprising from about 60% to about 99% by weight of vinylidene fluoride and from about 1% to about 40% by weight of one or more co-monomers;
   c) a blend of from about 10% to about 80% by weight high crystallinity vinylidene fluoride homopolymer and from about 20% to about 90% by weight low crystallinity vinylidene fluoride homopolymer;
   d) a vinylidene fluoride homopolymer or copolymer containing long chain branching; and
   e) a vinylidene fluoride copolymer containing a fraction of very high molecular weight vinylidene fluoride homopolymer or copolymer.

3. The membrane of claim 1, wherein the polymeric component has a crystallinity as determined by wide angle x-ray diffraction of at least about 20%.

4. The membrane of claim 1, wherein the polymeric component is a polymer which is a copolymer of from about 80% to about 99% by weight of vinylidene fluoride and from about 1% to about 20% by weight of one or more co-monomers selected from the group consisting of hexafluoropropylene, chlorotrifluoroethylene, tetrafluoroethylene, trifluoroethylene, vinylacetate, vinylsulfonic acid, vinyltrimethylsilane, tetrafluoropropylene, acrylic acid and methacrylic acid.

5. The membrane of claim 1, wherein the polymeric component is a blend of from about 10% to about 80% by weight vinylidene fluoride homopolymer and from about 20% to about 90% by weight of a copolymer comprising from about 80% to about 99% by weight of vinylidene fluoride and from about 1% to about 20% by weight of one or more co-monomers selected from the group consisting of hexafluoropropylene, chlorotrifluoroethylene, tetrafluoroethylene, trifluoroethylene, vinylacetate, vinylsulfonic acid, vinyltrimethylsilane, tetrafluoropropylene, acrylic acid and methacrylic acid.

6. The membrane of claim 1, wherein the polymeric component is a blend of from about 10% to about 80% by weight of a first vinylidene fluoride homopolymer having a degree of crystallinity of greater than 35% and from about 20% to about 90% by weight of a second vinylidene fluoride homopolymer having a degree of crystallinity of less than 20%.

7. The membrane of claim 1, wherein the porous wall is substantially free of macrovoids.

8. The membrane of claim 1, wherein the membrane is unsupported.

9. A membrane module, wherein i) the membrane module comprises a plurality of hollow porous fibers of a polymeric component, ii) the polymeric component has a crystallinity as determined by wide angle x-ray diffraction of less than about 40%, the polymeric component is comprised of at least one homopolymer or copolymer of vinylidene fluoride and iv) the membrane has an energy to break of at least about 0.5 J per square mm of membrane cross section.

10. The membrane module of claim 9, wherein the polymeric component is selected from the group consisting of:
   a) a polymer Which is a copolymer of from about 80% to about 99% by weight of vinylidene fluoride and from about 1% to about 20% by weight of one or more co-monomers;
   b) a blend of from about 10% to about 80% by weight vinylidene fluoride homopolymer and from about 20% to about 90% by weight of a copolymer comprising from about 60% to about 99% by weight of vinylidene fluoride and from about 1% to about 40% by weight of one or more co-monomers;
   c) a blend of from about 10% to about 80% by weight high crystallinity vinylidene fluoride homopolymer and from about 20% to about 90% by weight low crystallinity vinylidene fluoride homopolymer;
   d) a vinylidene fluoride homopolymer or copolymer containing long chain branching; and
   e) a vinylidene fluoride copolymer containing a fraction of very high molecular weight vinylidene fluoride homopolymer or copolymer.

11. The membrane module of claim 10, wherein the polymeric component has a crystallinity as determined by wide angle x-ray diffraction of at least about 20%.

12. The membrane module of claim 10, wherein the polymeric component is a polymer which is a copolymer comprising from about 80% to about 99% by weight of vinylidene fluoride and from about 1% to about 20% by weight of one or more co-monomers selected from the group consisting of hexafluoropropylene, chlorotrifluoroethylene, tetrafluoroethylene, trifluoroethylene, vinylacetate, vinylsulfonic acid, vinyltrimethylsilane, tetrafluoropropylene, acrylic acid and methacrylic acid.

13. The membrane module of claim 10, wherein the polymeric component is a blend of from about 10% to about 80% by weight vinylidene fluoride homopolymer and from about 20% to about 90% by weight of a copolymer comprising from about 60% to about 99% by weight of vinylidene fluoride and from about 1% to about 40% by weight of one or more co-monomers selected from the group consisting of hexafluoropropylene, chlorotrifluoroethylene, tetrafluoroethylene, trifluoroethylene, vinylacetate, vinylsulfonic acid, vinyltrimethylsilane, tetrafluoropropylene, acrylic acid and methacrylic acid.

14. The membrane module of claim 10, wherein the polymeric component is a blend of from about 10% to about 80% by weight of a first vinylidene fluoride homopolymer having a degree of crystallinity of greater than 35% and from about 20% to about 90% by weight of a second vinylidene fluoride homopolymer having a degree of crystallinity of less than 20%.

15. The membrane module of claim 10, wherein the polymeric component is a blend of vinylidene fluoride homopolymer or copolymer and methyl methacrylate homopolymer or copolymer.

16. A method of making a hollow porous fiber useful in manufacturing membrane modules, comprising:
   a) extruding a composition comprised of a polymeric component, a pore enhancement agent and a solvent capable of dissolving the polymeric component and the pore enhancement agent to form a hollow fiber; and
   b) removing the solvent and pore enhancement agent from the hollow fiber to form the hollow porous fiber;
   wherein the polymeric component has a crystallinity as determined by wide angle x-ray diffraction of less than about 35% and the polymeric component is comprised of at least one homopolymer or copolymer of vinylidene fluoride.

17. The method of claim 16, wherein the polymeric component is selected from the group consisting of:
   a) a polymer which is a copolymer of from about 80% to about 99% by weight of vinylidene fluoride and from about 1% to about 20% by weight of one or more co-monomers;
   b) a blend of from about 10% to about 80% by weight vinylidene fluoride homopolymer and from about 20% to about 90% by weight of a copolymer comprising from about 60% to about 99% by weight of vinylidene fluoride and from about 1% to about 40% by weight of one or more co-monomers;
   c) a blend of from about 10% to about 80% by weight high crystallinity vinylidene fluoride homopolymer and from about 20% to about 90% by weight low crystallinity vinylidene fluoride homopolymer;
   d) a vinylidene fluoride homopolymer or copolymer containing long chain branching; and
   e) a vinylidene fluoride copolymer containing a fraction of very high molecular weight vinylidene fluoride homopolymer or copolymer.

18. The method of claim 16, wherein the pore enhancement agent is miscible with or soluble in water.

19. The method of claim 16, Wherein the solvent and pore enhancement agent are removed from the hollow fiber by soaking the hollow fiber in water.

20. The method of claim 16, wherein the solvent is selected from the group consisting of amides, ketones, carbonates, ethers, ureas, trialkyl phosphates, esters, dimethylsulfoxide, hexamethylphosphoramide and combinations thereof.

21. A method of making a membrane module, comprising forming a plurality of membranes in accordance with claim 1 into a bundle.

\* \* \* \* \*